United States Patent
Zhao et al.

(10) Patent No.: US 7,263,126 B2
(45) Date of Patent: Aug. 28, 2007

(54) SYSTEM AND METHOD FOR TRANSCODING WITH ADAPTIVE BIT RATE CONTROL

(75) Inventors: Jie Zhao, Vancouver, WA (US); Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 777 days.

(21) Appl. No.: 10/662,661

(22) Filed: Sep. 15, 2003

(65) Prior Publication Data
US 2005/0058198 A1    Mar. 17, 2005

(51) Int. Cl.
*H04N 7/18* (2006.01)
(52) U.S. Cl. .............. 375/240.04; 375/240.05
(58) Field of Classification Search .............. 375/240.01–240.29
See application file for complete search history.

(56) References Cited

U.S. PATENT DOCUMENTS

| | | | | |
|---|---|---|---|---|
| 6,167,084 A | * | 12/2000 | Wang et al. | 375/240.02 |
| 6,310,915 B1 | | 10/2001 | Wells et al. | 375/240.03 |
| 6,407,681 B2 | | 6/2002 | Gatepin et al. | 341/63 |
| 7,099,389 B1 | * | 8/2006 | Yu et al. | 375/240.12 |
| 2002/0159523 A1 | | 10/2002 | Wang et al. | 375/240.05 |
| 2005/0254791 A1 | * | 11/2005 | Ducloux et al. | 386/111 |

FOREIGN PATENT DOCUMENTS

| EP | 1045590 | 10/2000 |
|---|---|---|
| EP | 1067798 | 1/2001 |

* cited by examiner

*Primary Examiner*—Anand Rao
(74) *Attorney, Agent, or Firm*—Law Office of Gerald Maliszewski; Gerald Maliszewski

(57) ABSTRACT

A system and method are provided for adaptive rate control in the transcoding of video streams. The method comprises: accepting frames of an input MPEG encoded video stream; decoding the video stream; determining video stream complexity; for each frame, calculating an output video stream quantization parameter (Qo) responsive to determined video stream complexity; and, encoding the output video stream into a protocol using Qo. Some aspects further comprise accepting a target bit rate ratio (r) for transcoding that is equal to the ratio of the target output video stream number of bits per frame (No), to the input video stream number of bits per frame (Ni). Then, Qo is also calculated in response to the value of r. More explicitly, Qo is calculated in response to a complexity ratio of: an accumulated complexity in the output video stream, to an accumulated complexity in the input video stream.

22 Claims, 4 Drawing Sheets

STEP 1. GET THE PICTURE TYPE AND $N_{i,k}$, $Q_{i,k}$, FROM PARSED MPEG-2 STREAM

STEP 2. IF THIS IS THE FIRST TIME FOR THIS TYPE, SET $Q_{o,k}$ EQUAL TO $Q_{i,k}/r$ AND GO TO STEP SEVEN

STEP 3. UPDATE THE ACCUMULATED TARGET BITS, TARGET COMPLEXITY, ACTUAL BITS, AND ACTUAL COMPLEXITY FOR THIS PICTURE TYPE

STEP 4. COMPUTE THE COMPLEXITY RATIO $\alpha_k = \dfrac{\sum_{j=0}^{k-1}(Q_{o,j} \cdot N_{o,j})}{\sum_{j=0}^{k-1}(Q_{i,j} \cdot N_{i,j})}$ STEP 5. COMPUTE THE BIT RATE ADJUSTMENT FACTOR $B_k = \dfrac{\sum_{j=0}^{k-1} N_{o,j}}{r \cdot \sum_{j=0}^{k-1} N_{i,j}} = \dfrac{r_{k'}}{r}$ STEP 6. COMPUTE $Q_{o,k} = \dfrac{\alpha_k \cdot Q_{i,k}}{r} \cdot B_k$ STEP 7. ENCODE THIS FRAME USING $Q_{o,k}$ AS THE QUANTIZATION PARAMETER

STEP 8. REPEAT STEP ONE TO STEP SEVEN FOR ALL THE REMAINING FRAMES

SYSTEM AND METHOD FOR TRANSCODING WITH ADAPTIVE BIT RATE CONTROL

BACKGROUND OF THE INVENTION

1. Field of the Invention

This invention generally relates to digital image communication processes and, more particularly, to a system and method for adaptively controlling the bit rate, when transcoding between compressed video protocols.

2. Description of the Related Art

Compressed digital video is widely used in multimedia applications. There exist many digital video coding standards. Different applications and environments have different video stream requirements. Therefore, the conversion of digital video bitstreams from one compressed format, into another, is necessary. This process is called video transcoding. The format change may be a different bitrate, frame size, or even compression standard.

The conventional rate control method uses a one-pass process. With conventional rate control, the encoder makes assumptions concerning the picture types, without knowledge of the sequence. It controls bit allocations and quantization based on the pictures already coded. This is not optimal for the overall bit allocation.

As noted in U.S. Pat. No. 6,310,915, in the MPEG-2 standard pictures are both spatially and temporally encoded. Each picture is first divided into non-overlapping macroblocks, where each macroblock includes a 16×16 array of luminance samples and each block or array of 8×8 chrominance samples overlaid thereon. A decision is made to encode the macroblock as an inter macroblock, in which case the macroblock is both temporally and spatially encoded, or to encode the macroblock as an intra macroblock, in which case the macroblock is only spatially encoded. A macroblock is temporally encoded by an inter-picture motion compensation operation. According to such an operation, a prediction macroblock is identified for the to-be-motion compensated macroblock and is subtracted therefrom to produce a prediction error macroblock. The prediction macroblock originates in another picture, called a reference picture, or may be an interpolation of multiple prediction macroblocks, each originating in different reference pictures. The prediction macroblock need not have precisely the same spatial coordinates (pixel row and column) as the macroblock from which it is subtracted and in fact can be spatially offset therefrom. A motion vector is used to identify the macroblock by its spatial shift and by the reference picture from which it originates. (When the prediction macroblock is an interpolation of multiple prediction macroblocks, a motion vector is obtained for each to-be-interpolated prediction macroblock).

Pictures may be classified as intra or I pictures, predictive or P pictures and bidirectionally predictive or B pictures. An "I" picture contains only intra macroblocks. A "P" picture may contain inter macroblocks, but only forward directed predictions from a preceding reference picture are permitted. A "P" picture can also contain intra macroblocks for which no adequate prediction was found. In addition, a dual prime prediction may be formed for a P picture macroblock in an interlaced picture, which is an interpolated prediction from the immediately two preceding reference fields. A "B" picture can contain intra macroblocks, inter macroblocks that are forward motion compensated, inter macroblocks that are backward motion compensated, i.e., predicted from a succeeding reference picture, and inter macroblocks that are bidirectionally motion compensated, i.e., predicted from an interpolation of prediction macroblocks in each of preceding and succeeding reference pictures. If the P or B pictures are interlaced, then each component field macroblock can be separately motion compensated or the two fields can be interleaved to form a frame macroblock and the frame block can be motion compensated at once.

Spatial compression is performed on selected 8×8 luminance pixel blocks and selected 8×8 pixel chrominance blocks of selected prediction error macroblocks, or selected intra macroblocks. Spatial compression includes the steps of discrete cosine transforming each block, quantizing each block, zig-zag (or alternate) scanning each block into a sequence, run-level encoding the sequence and variable length encoding the run-level encoded sequence. Prior to discrete cosine transformation, a macroblock of a frame picture may optionally be formatted as a frame macroblock, including blocks containing alternating lines of samples from each of the two component field pictures of the frame picture, or as a field macroblock, where the samples from different fields are arranged into separate blocks of the macroblock. The quantization parameter may be changed on a macroblock-by-macroblock basis and the weighting matrix may be changed on a picture-by-picture basis. Macroblocks, or coded blocks thereof, may be skipped if they have zero (or nearly zero) valued coded data. Appropriate codes are provided into the formatted bitstream of the encoded video signal, such as non-contiguous macroblock address increments, or coded block patterns, to indicate skipped macroblocks and blocks.

Additional formatting is applied to the variable length encoded sequence to aid in identifying the following items within the encoded bitstream: individual sequences of pictures, groups of pictures of the sequence, pictures of a group of pictures, slices (contiguous sequences of macroblocks of a single macroblock row) of pictures, macroblocks of slices and motion vectors and blocks of macroblocks. Some of the above layers are optional, such as the group of pictures layer and the slice layer, and may be omitted from the bitstream if desired. (If slice headers are included in the bitstream, one slice header is provided for each macroblock row.) Various parameters and flags are inserted into the formatted bitstream as well indicating each of the above noted choices (as well as others not described above). The following is a brief list of some of such parameters and flags: picture coding type (I,P,B), macroblock type (i.e., forward predicted, backward predicted, bidirectionally predicted, spatially encoded only) macroblock prediction type (field, frame, dual prime, etc.), DCT type (i.e., frame or field macroblock format for discrete cosine transformation), the quantizer scale code, etc.

Generally speaking, it is desirable to use the same picture coding type and the same intra/inter macroblock decisions in the subsequent encoding of the transcoding operation as was done in originally encoding the video signal fed to the transcoder. This maintains picture quality.

As noted in U.S. Pat. No. 6,587,508, a conventional transcoder is designed to input first bit streams at a predetermined input bit rate through the input terminal, to convert the first bit streams into second bit streams to be output at a predetermined output bit rate, i.e., a target bit rate, equal to, or lower than the input bit rate of the inputted first bit streams. The conventional transcoder may comprise a variable length decoder, a de-quantizer, a quantizer, a variable length encoder, and a rate controller.

The variable length decoder is designed to decode a coded moving picture sequence signal within the first bit streams to reconstruct an original picture data for each of pictures including a matrix of original quantization coefficients. The de-quantizer is designed to input the matrix of original quantization coefficients level from the variable length decoder and the first quantization parameter. The de-quantizer is further designed to inversely quantize the inputted matrix of original quantization coefficients level with the first quantization parameter to generate a matrix of de-quantization coefficients, referred to as "dequant", i.e., DCT coefficients, for each of macroblocks as follows:

$$dequant = \{2 \times level + sign(level)\} \times Q1 \times QM \text{ DIVIDED } 32; \quad (a)$$

or, $$dequant = level \times Q1 \times QM \text{ DIVIDED } 16; \quad (b)$$

where the equation (a) is used for the inter macroblock, while the equation (b) is used for the intra macroblock. QM is a matrix of quantization parameters stored in a predetermined quantization table. The first quantization parameter Q1 and the matrix of quantization parameters QM are derived from the inputted first bit streams by the decoder. Here, the original quantization coefficients level, the de-quantization coefficients dequant, the matrix of quantization parameters QM, and the first quantization parameter Q1 are integers. The de-quantization coefficients dequant calculated by the equations (a) and (b) should be rounded down to the nearest one.

The quantizer is designed to input the matrix of de-quantization coefficients dequant from the de-quantizer and then quantize the inputted matrix of de-quantization coefficients dequant for each of macroblocks with a second quantization parameter, referred to as "Q2" hereinlater, to generate a matrix of re-quantization coefficients, referred to as "tlevel", as follows:

$$tlevel = dequant \times 16 \text{ DIVIDED } Q2 \times QM; \quad (c)$$

or, $$tlevel = dequant \times 16 \text{ DIVIDED } Q2 \times QM + sign(dequant) \times 1 \text{ DIVIDED } 2; \quad (d)$$

where the equation (c) is used for the inter macroblock, while the equation (d) is used for the intra macroblock. The second quantization parameter Q2 is obtained by the rate controller. Here, the re-quantization coefficients tlevel and the second quantization parameter Q2 are also integers. The re-quantization coefficients tlevel calculated by the equations (c) and (d) should be rounded down to the nearest one.

The variable length encoder is designed to input the re-quantization coefficients tlevel from the quantizer and then encode the inputted matrix of the re-quantization coefficients tlevel to generate an objective picture data for each of pictures to sequentially output the objective picture data in the form of the second bit streams. The variable length encoder is designed to input a diversity of information included in the first bit streams necessary for the second bit streams from the variable length decoder.

The rate controller is designed to perform a rate control over the encoding in the conventional transcoder according to the TM-5 on the basis of the information obtained from the de-quantizer as described below.

The transcoder, however, has no information on the structure of group of pictures, such as a picture rate of I or P-pictures within each of the group of pictures, so that the transcoder must estimate the structure of group of pictures within the inputted moving picture sequence to allocate bits for each type of pictures within the estimated structure of group of pictures. Furthermore, the transcoder is required to decode the first bits streams almost all over the layers, such as the sequence layer, the group of pictures layer, the picture layer, the slice layer, and the macroblock layer in order to derive necessary data for transcoding from the first bits streams. This operation wastes time, thereby causing the delay in the transcoding process.

An improved convention is adapted to perform the rate control without estimating the structure of group of pictures. This transcoder further comprises a delay circuit. The delay circuit is interposed between the variable length decoder and the de-quantizer and designed to control the flow of the signal from the variable length decoder to the de-quantizer. The delay circuit is operated to delay starting the de-quantizating process in the de-quantizer until the variable length decoder has been finished to decode one of the pictures in the coded moving picture sequence signal. However, the de-quantizer must wait until the decoding process of the picture has been completed over the entire target transcoding frame, thereby causing the delay in the transcoding process.

Another conventional transcoder includes a target output bit updating unit and a quantization parameter computing unit, in addition to a target ratio computing unit and a bit difference computing unit. This transcoder can perform the rate control on the basis of the formation on the number of coding bits previously recorded in the input bit streams. This transcoder has information on the number of coding bits previously recorded in the bits stream, making it possible to solve the problem of the delay in the second conventional transcoder. The third conventional transcoder, however, has another problem. The encoder that is linked with the third transcoder must provide the above information on the number of coding bits to be recorded in the bit streams, thereby causing the delay of process in the encoder.

In the case of a transcoder, the picture coding type and inter/intra macroblock decision is preferably constrained to be the same during a successive encoding as it was during the previous encoding. As such, the encoder of a transcoder has only two options available for varying the encoding. First, while the transcoder's decoder decodes pictures of the bitstream, information regarding the decoded picture types can be gathered. The transcoder's encoder extrapolates from this information as to what picture types are expected and allocates bits accordingly. However, this solution does not work well if the group of pictures structure of the bitstream changes. For example, the group of picture structure can change from IBBPBBPBBPBBI to IIIIIII. In such a case, the extrapolation of picture coding type will be erroneous. In the example above, the unanticipated rise in I picture frequency will result in an incorrect allocation of bits and degraded quality for unanticipated I pictures.

Second, the transcoder can make no assumption about picture types and simply scale the number of bits used in the original encoding according to the ratio of the bit rate of the originally encoded bitstream to the bit rate of the re-encoded bitstream produced by the transcoder. However, this solution does not work well if the bit rate of the originally encoded bitstream fed to the transcoder is far higher than the bit rate of the re-encoded bitstream produced by the transcoder. The reason for this is that the difference in the number of bits used for different picture coding types is inversely correlated with the bit rate of the signal. Thus, at very high bit rates, B pictures have a similar number of bits of encoded data as I pictures yet at low bit rates, I pictures have far more bits of encoded data than B pictures.

It would be advantageous if the transcoding process could take advantage of the known complexity of the input bitstream, as expressed in the number of bit per frame and the quantization per frame, to determine the quantization factor of the output bitstream.

SUMMARY OF THE INVENTION

The present invention introduces a novel method of picture-level rate control during transcoding. As way of an example, MPEG-2 to MPEG-4 transcoding is demonstrated. The transcoding process begins with a compressed bitstream, an MPEG-2 bitstream for example. The information embedded in the input stream is used in the present invention to achieve a better rate control. During the MPEG-2 decoding pass, information derived from decoding the input bitstream, such as the picture type, bits used by each frame, and/or the average quantization parameter (Qp) of each frame, is gathered. This information is used for the external rate control of the MPEG-4 encoding pass. A Qp scale factor is adaptively estimated to scale the Qp from the input video stream. As used herein, the Qp associated with the input stream is expressed herein as Qi, and the Qp associated with the output stream is called Qo.

The scale factor consists of two parts: one is the complexity ratio information between the actual (current) output complexity and the input complexity; the other is the bitrate correction factor based on the ratio of the actual bits produced verses the target bits. Both factors are adaptively adjusted over the encoding process. Separate rate controls are performed for different picture types (I, P, and B). In this manner, the bit allocation among different picture types tracks the allocation in the input MPEG-2 stream. By using this rate control method, the encoder can meet the bitrate target very closely and achieve an overall better visual quality than using the internal (conventional) MPEG-4 rate control.

Accordingly, a method is provided for adaptive rate control in the transcoding of video streams. The method comprises: accepting frames of an input MPEG encoded video stream; decoding the video stream; determining video stream complexity; for each frame, calculating an output video stream quantization parameter (Qo) responsive to determined video stream complexity; and, encoding the output video stream into a protocol using Qo.

Some aspects of the method further comprise accepting a target bit rate ratio (r) for transcoding the video stream that is equal to the ratio of the target output video stream number of bits per frame (No), to the input video stream number of bits per frame (Ni) as follows:

$r=No/Ni.$

Then, Qo is calculated in response to the value of r, as well as the video stream complexity.

More explicitly, Qo is calculated in response to a complexity ratio of: an accumulated complexity in the output video stream, to an accumulated complexity in the input video stream. The accumulated complexity in the input video stream is the product of Qi times Ni, accumulated over a plurality of frames. Likewise, the accumulated complexity of the output video stream is the product of Qo times No, accumulated over the plurality of frames.

Therefore, the complexity ratio ($\alpha_k$) can be expressed as follows:

$$\alpha_k = \frac{\sum_{j=0}^{k-1}(Q_{o,j} \cdot N_{o,j})}{\sum_{j=0}^{k-1}(Q_{i,j} \cdot N_{i,j})};$$

where j equals the plurality of frames; and,
where k is the current frame.

Other aspects of the method further comprise: determining an actual bit rate ratio (r') for transcoding the video stream as follows:

$r'=No/Ni;$ where No and Ni are accumulated over a plurality of frames; and, determining a feedback correction factor ($B_k$) responsive to the value of r'($B_k$=r'/r). Then, the calculation of Qo includes modifying the value of Qo in response to $B_k$.

Additional details of the above-described method, and a system for adaptive rate control in the transcoding of video streams, are provided below.

DETAILED DESCRIPTION OF THE PREFERRED EMBODIMENTS

Figure 1:
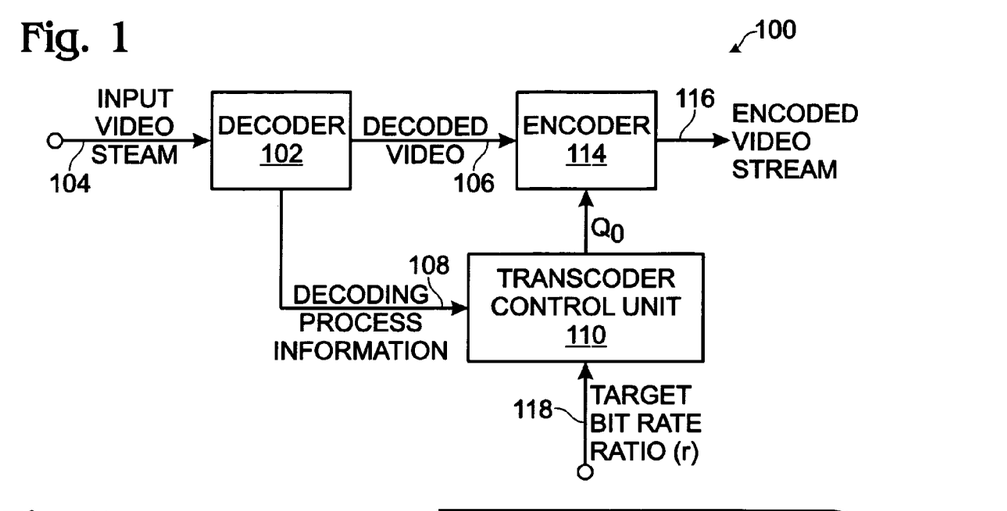
FIG. 1 is a schematic block diagram of the present invention system for adaptive rate control in the transcoding of video streams.

FIG. 1 is a schematic block diagram of the present invention system for adaptive rate control in the transcoding of video streams. The system 100 comprises a decoder 102 having an interface on line 104 to accept frames of an input MPEG encoded video stream and an interface on line 106 to supply a decoded video stream. The decoder 102 has an interface on line 108 to supply decoding process information.

A transcoder control unit 110 has an interface on line 108 to accept the decoding process information. The transcoder control unit 110 determines video stream complexity and supplies an output video stream quantization parameter (Qo) on line 112 that is responsive to determined video stream complexity for each frame of the decoded video stream. An encoder 114 has an interface on line 106 to accept the decoded video and an interface on line 112 to accept Qo. The encoder 114 has an interface on line 116 to supply an output video stream encoded into a protocol using Qo. Typically, the output stream protocol is different than the input stream protocol.

In one aspect of the system 100, the transcoder control unit 110,has an interface on line 118 to accept a target bit rate ratio (r) for transcoding the video stream. The target bit rate ratio r is equal to the ratio of the target output video stream number of bits per frame (No), to the input video stream number of bits per frame (Ni) as follows:

$r=No/Ni.$

The transcoder control unit 110 calculates Qo responsive to the value of r, as well as in response to the video stream complexity. In one aspect of the invention, the decoder 102 accepts an MPEG-2 input video stream and the encoder 114 encodes the output video stream into an MPEG-4 protocol.

The decoder 102 supplies decoder processing information that includes an average input video stream quantization factor (Qi) for each frame. Initially, the transcoder control unit 110 calculates Qo as follows:

$Qo=Qu/r.$

More explicitly, the decoder 102 accepts frames, on line 104, of an input MPEG encoded video stream with a plurality of slices. The decoder 102 calculates Qi for each frame by averaging the Qi values for each slice in a frame. As explained in more detail below, the calculation of Qo is refined with the collection of more information.

Typically, the decoder 102 accepts an input MPEG encoded video stream with intra (I), predictive (P), and bi-directionally predictive (B) picture types. The transcoder control unit 110 independently determines the complexities of the I, P, and B picture types in the input video stream. Alternately stated, the transcoder control unit 110 calculates a video stream complexity for each picture type. Likewise, the transcoder control unit 110 independently determines the complexities of the I, P, and B picture types in the output video stream.

More specifically, the transcoder control unit 110 calculates Qo in response to a complexity ratio of: an accumulated complexity in the output video stream; to an accumulated complexity in the input video stream. The accumulated complexity in the input video stream is the product of Qi times Ni, accumulated over a plurality of frames. Likewise, the accumulated complexity of the output video stream is the product of Qo times No, accumulated over the plurality of frames.

Then, the transcoder control unit 110 calculates the complexity ratio ($\alpha_k$) as follows:

$$\alpha_k = \frac{\sum_{j=0}^{k-1}(Q_{o,j} \cdot N_{o,j})}{\sum_{j=0}^{k-1}(Q_{i,j} \cdot N_{i,j})};$$

where j equals the plurality of frames; and,
where k is the current frame.

Thus, the transcoder control unit 110 calculates Qo, for each frame, as follows:

$Qo=(\alpha_k \cdot Qi)/r.$

In some aspects of the system 100, the transcoder control unit 110 determines an actual bit rate ratio (r') for transcoding the video stream as follows:

$r'=No/Ni;$ where No and Ni are accumulated over a plurality of frames.

Then, the transcoder control unit 110 determines a feedback correction factor ($B_k$) responsive to the value of r', and modifies the value of Qo in response to $B_k$. More specifically, the transcoder control unit 110 determines $B_k$, for each frame, as follows:

$B_k=r'/r.$

Thus, the transcoder control unit 110 calculates Qo, for each frame, as follows:

$Qo=(\alpha_k \cdot Qi)/r \cdot B_k;$ where the value of $\alpha_k$ (and $B_k$) is updated after every frame.

FUNCTIONAL DESCRIPTION

The present invention method for picture-level rate control, is described below in the context of transcoding from MPEG-2, to an MPEG-4 video stream with a lower bit rate. However, it should be understood that the present invention method can be used for transcoding between other standards.

Ideally, the transcoding result should be of the same visual quality as the MPEG-2 source. A straightforward way to do it is to fully decode the MPEG-2 stream and re-encode it using an MPEG-4 encoder. However, this approach ignores the fact that there is valuable information in the MPEG-2 stream that can be used for rate control. Since the present invention targets the problem of rate control, the picture type, average quantization parameter (Qp), and bit usage of each frame from the MPEG-2 stream can be used to control the MPEG-4 encoding.

A modified cascade decoder and encoder, with an external rate control, are shown in FIG. 1. First, the MPEG-2 stream is decoded to extract needed information, referred to herein as decoding process information. The average Qp of a frame is computed by averaging the Qp of all the slices in a frame. In the MPEG-4 encoding pass, the encoder uses the same picture type as the MPEG-2 frame, and it uses an external rate control instead of its internal one. A Qp scale factor is generated for each frame, to scale the input Qp (Qi) for use in encoding an MPEG-4 frame. The present invention derives this scale factor.

The ratio between the target MPEG-4 bit rate and the MPEG-2 bit rate is r (r≦1). The goal of the rate control is to achieve $$\sum_{k=0}^{t} N_{o,k} = r \cdot \sum_{k=0}^{t} N_{i,k}, \quad (1)$$

Where N denotes the number of bits actually used in one frame, subscript "o" represents the output MPEG-4, subscript "i" represents the input MPEG-2, and the subscript "k" represents the frame index. The sum is the sum of all the frames. The target number of bits of one MPEG-4 frame is set to be:

$$N_{o,k}=r \cdot N_{i,k} \quad (2)$$

This will not only achieve the goal, as expressed in equation 1, but also tracks the relative bit allocations of MPEG-2 source. It is known that number of bits used in a frame is loosely inverse proportional to its quantization parameter (Qp). So for each frame k, there must exist a constant $\alpha_k$ so that:

$$r = \frac{N_{o,k}}{N_{i,k}} = \alpha_k \cdot \frac{Q_{i,k}}{Q_{o,k}} \quad (3)$$

Where Q denotes Qp. Equation (3) can be expressed as:

$$\alpha_k = \frac{Q_{o,k} \cdot N_{o,k}}{Q_{i,k} \cdot N_{i,k}} \quad (4)$$

According to MPEG-2 Test Model 5 (TM5; ISO/IEC JTC1/SC29/WG11, MPEG-2 Test Model 5, April 1993a), picture complexity measure is defined as the product of the bits generated and the average quantization parameter. In TM5, separate complexity measures are defined for I, P, and B picture types. So actually, Cak is the complexity ratio between the corresponding MPEG-4 and MPEG-2 frame. Complexity is a relative measure to describe the difficulties in coding a frame, as compared to other frames in the same sequence. The complexity values of the same frame in the input MPEG-2 and the transcoded MPEG-4 stream are likely to be different, because they are coded using different standards, encoders, and bit rates. Complexity changes are also dependent on picture types, and picture content. However, since the complexity changes for every frame result from the same cause (change of standard, encoders, and bit rate), it's reasonable to assume that the complexity change ratio for the same picture type is relatively constant, at least over a short period of time.

Therefore, the present invention estimate $\alpha_k$ is based on the accumulated complexities of the previous frames of the same type. Three complexity ratios are estimated separately for I, P, and B pictures. The accumulation may be done from the sequence start or from a GOP start.

$$\alpha_k = \frac{\sum_{j=0}^{k-1} (Q_{o,j} \cdot N_{o,j})}{\sum_{j=0}^{k-1} (Q_{i,j} \cdot N_{i,j})} \quad (5)$$

Knowing $\alpha_k$, from Equation (3), the quantization parameter Qo of frame "k" can be initialized to be, $$Q_{o,k} = \frac{\alpha_k \cdot Q_{i,k}}{r} \quad (6)$$

For any estimation, a feedback correction factor is helpful. Initializing $Q_{o,k}$ as in (6) can make the bits produced ($N_{o,k}$) close to the target $r \cdot N_{i,k}$, but the count won't be exactly equal. To achieve the target bit rate needed to meet Equation (1), another rate adjustment factor ($B_k$) is introduced. It is defined as the ratio of actually used bits verses the target bits. That is, the actual bit rate ratio (r') vs. the target bit rate ratio r. Again, factors for I, P, and B pictures are estimated separately.

$$B_k = \frac{\sum_{j=0}^{k-1} N_{o,j}}{r \cdot \sum_{j=0}^{k-1} N_{i,j}} = \frac{r'_k}{r} \quad (7)$$

With this correction, combining Equation (5) and (7), $Q_{o,k}$ becomes:

$$Q_{o,k} = \frac{\alpha_k \cdot Q_{i,k}}{r} \cdot B_k \quad (8)$$

Rate control for I, P, and B frames is performed separately. In this manner, the bit allocation ratio among I, P, and B remains the same as the MPEG-2 stream. The independent bit allocation ratio prevents a poor B picture, for example, from consuming too many bits, adversely affecting I and P picture qualities, as there are too few bits available for them. Adjustment to the bit allocation among these pictures may be performed, for example, using the method in MPEG-2 Test model 5.

Figure 2:
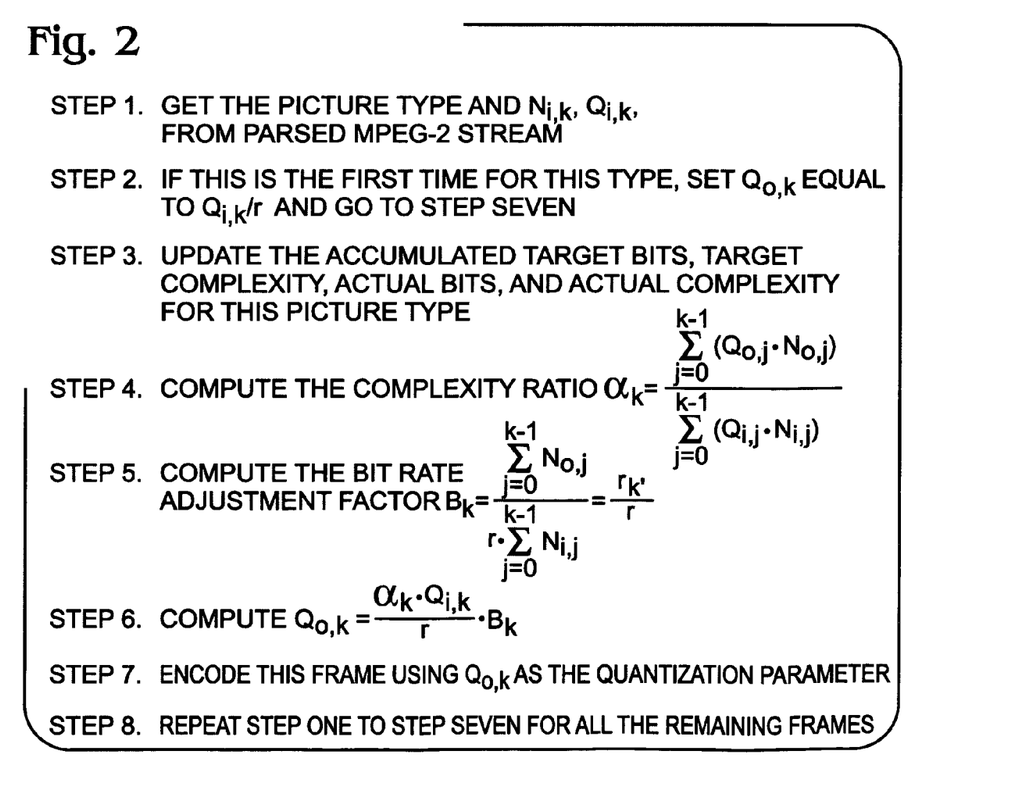
FIG. 2 is a diagram with steps summarizing one aspect of the present invention rate control method.

FIG. 2 is a diagram with steps summarizing one aspect of the present invention rate control method. Using the present invention rate control method, the transcoding meets the target rate. Depending on the ratio of the bit rate reduction, the quality degrades smoothly along a whole sequence of frames, as compared to the MPEG-2 source. Compared to MPEG-4 encoding using an internal rate control (CBR-based rate control), the overall visual quality is better using the new rate control method.

Figure 3:
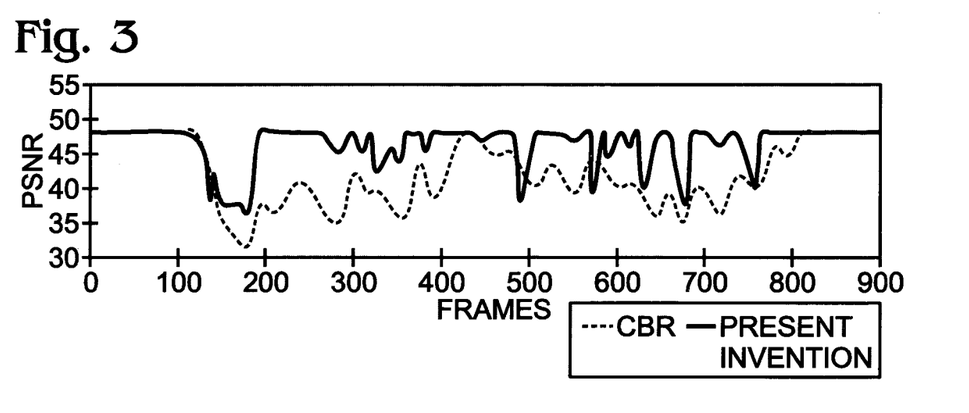
FIG. 3 through 5 are drawings comparing the peak signal-to-noise ratio (PSNR) of I, P, and B picture types, respectively, encoded using the present invention and CBR methods.
Figure 4:
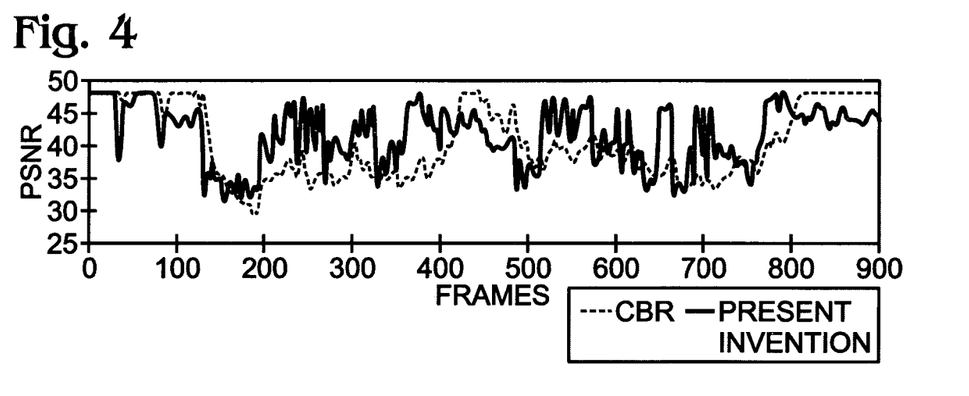
Figure 5:
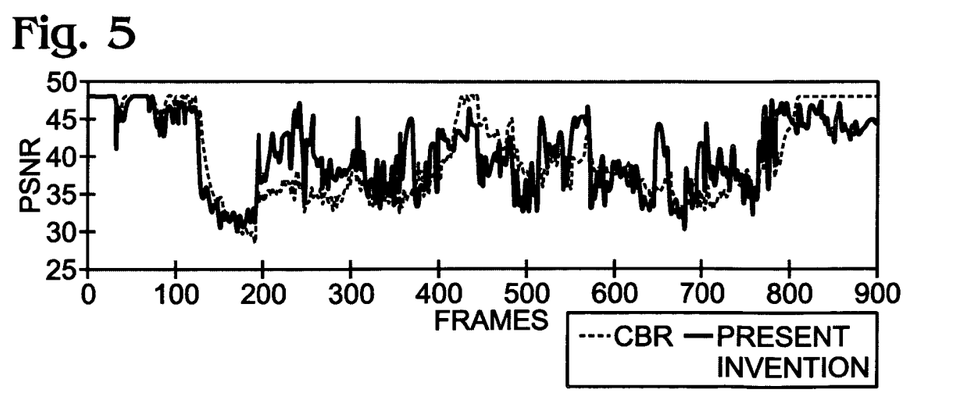

FIGS. 3 through 5 are drawings comparing the peak signal-to-noise ratio (PSNR) of I, P, and B picture types, respectively, encoded using the present invention and CBR methods. In this experiment, the MPEG-2 source was a high quality "Star War" movie trailer. It had 900 frames, and an average bit rate of 4.7 Mb/s. This sequence included a lot of motions and scene changes. It was transcoded to MPEG-4 stream targeted at 80% of the original bit rate. With the constant bit rate (CBR) method, the encoder had no knowledge of the MPEG-2 sequence, and the "I" picture interval was set to be 15 frames. From the figures, it can be seen that the present invention method is better than the CBR method in most cases. It's especially obvious for I and P pictures. The good quality is preserved along the whole sequence. The average PSNRs of coding I, P, and B pictures using both rate control methods are listed in Table 1.

TABLE 1

Average PSNR using present invention and CBR rate control methods

|  | present invention rate control (PSNRs) | CBR rate control (PSNRs) |
| --- | --- | --- |
| I Pictures | 46.3598 | 42.260 |
| P Pictures | 41.945 | 40.253 |
| B Pictures | 40.9600 | 39.882 |

Figure 6:
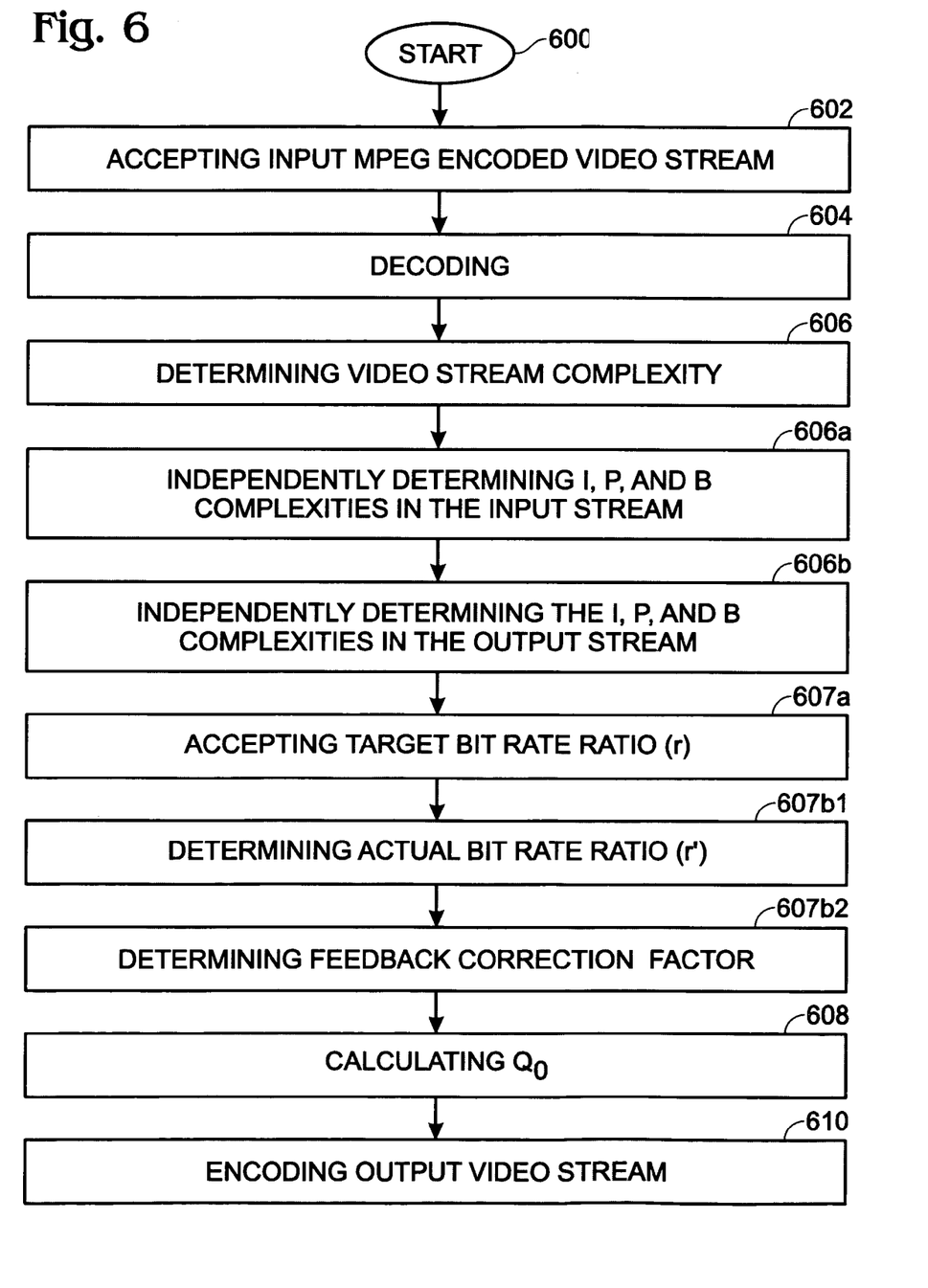
FIG. 6 is a flowchart illustrating the present invention method for adaptive rate control in the transcoding of video streams.

FIG. 6 is a flowchart illustrating the present invention method for adaptive rate control in the transcoding of video streams. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 600.

Step 602 accepts frames of an input MPEG encoded video stream. Step 604 decodes the video stream. Step 606 determines video stream complexity. Step 608, for each frame, calculates an output video stream quantization parameter (Qo) responsive to determined video stream complexity. Step 610 encodes the output video stream into a protocol using Qo.

In some aspects of the method, Step 607a accepts a target bit rate ratio (r) for transcoding the video stream that is equal to the ratio of the target output video stream number of bits per frame (No), to the input video stream number of bits per frame (Ni) as follows:

$r=No/Ni.$

Then, calculating Qo responsive to the determined video stream complexity in Step 610 includes calculating Qo in response to the value of r. In one aspect, Step 610 encodes the output video stream into an MPEG-4 video stream using r.

In some aspects, determining the video stream complexity of the input video stream in Step 606 includes calculating an average input video stream quantization factor (Qi) for each frame. Then, calculating Qo responsive to the determined video stream complexity in Step 610 includes initially calculating Qo as follows:

$Qo=Qi/r.$

In some aspects, accepting frames of an input MPEG encoded video stream in Step 602 includes accepting frames with a plurality of slices. Calculating Qi for each frame in Step 606 includes calculating the quantization parameter by averaging the Qi values for each slice in a frame. In other aspects, accepting an input MPEG encoded video stream in Step 602 includes accepting intra (I), predictive (P), and bi-directionally predictive (B) picture types. Then, determining the video stream complexity of the input MPEG encoded video stream in Step 606 includes substeps. Step 606a independently determines the complexities of the I, P, and B picture types in the input video stream. Step 606b independently determines the complexities of the I, P, and B picture types in the output video stream.

In one aspect, determining the video stream complexity in Step 606 includes determining a complexity ratio: of an accumulated complexity in the output video stream, to an accumulated complexity in the input video stream. The accumulated complexity in the input video stream is the product of Qi times Ni, accumulated over a plurality of frames. The accumulated complexity of the output video stream is the product of Qo times No, accumulated over the plurality of frames. Thus, the complexity ratio ($\alpha_k$) can be expressed as follows:

$$\alpha_k = \frac{\sum_{j=0}^{k-1}(Q_{o,j} \cdot N_{o,j})}{\sum_{j=0}^{k-1}(Q_{i,j} \cdot N_{i,j})};$$

where j equals the plurality of frames; and,
where k is the current frame.

Thus, calculating (Qo) in Step 610 includes calculating Qo, for each frame, as follows:

$Qo=(\alpha_k \cdot Qi)/r.$

In some aspects, a further step, Step 607b1 determines an actual bit rate ratio (r') for transcoding the video stream as follows:

$r'=No/Ni;$ where No and Ni are accumulated over a plurality of frames. Step 607b2 determines a feedback correction factor ($B_k$) responsive to the value of r'. Then, calculating Qo in Step 610 includes modifying the value of Qo in response to $B_k$.

In one aspect, determining $B_k$ in Step 607b includes determining $B_k$, for each frame, as follows:

$B_k=r'/r.$

Then, calculating Qo in Step 610 includes calculating Qo, for each frame, as follows:

$Qo=(\alpha_k \cdot Qi)/r \cdot B_k;$ where the value of $\alpha_k$ (as well as $B_k$) is updated after every frame.

Figure 7:
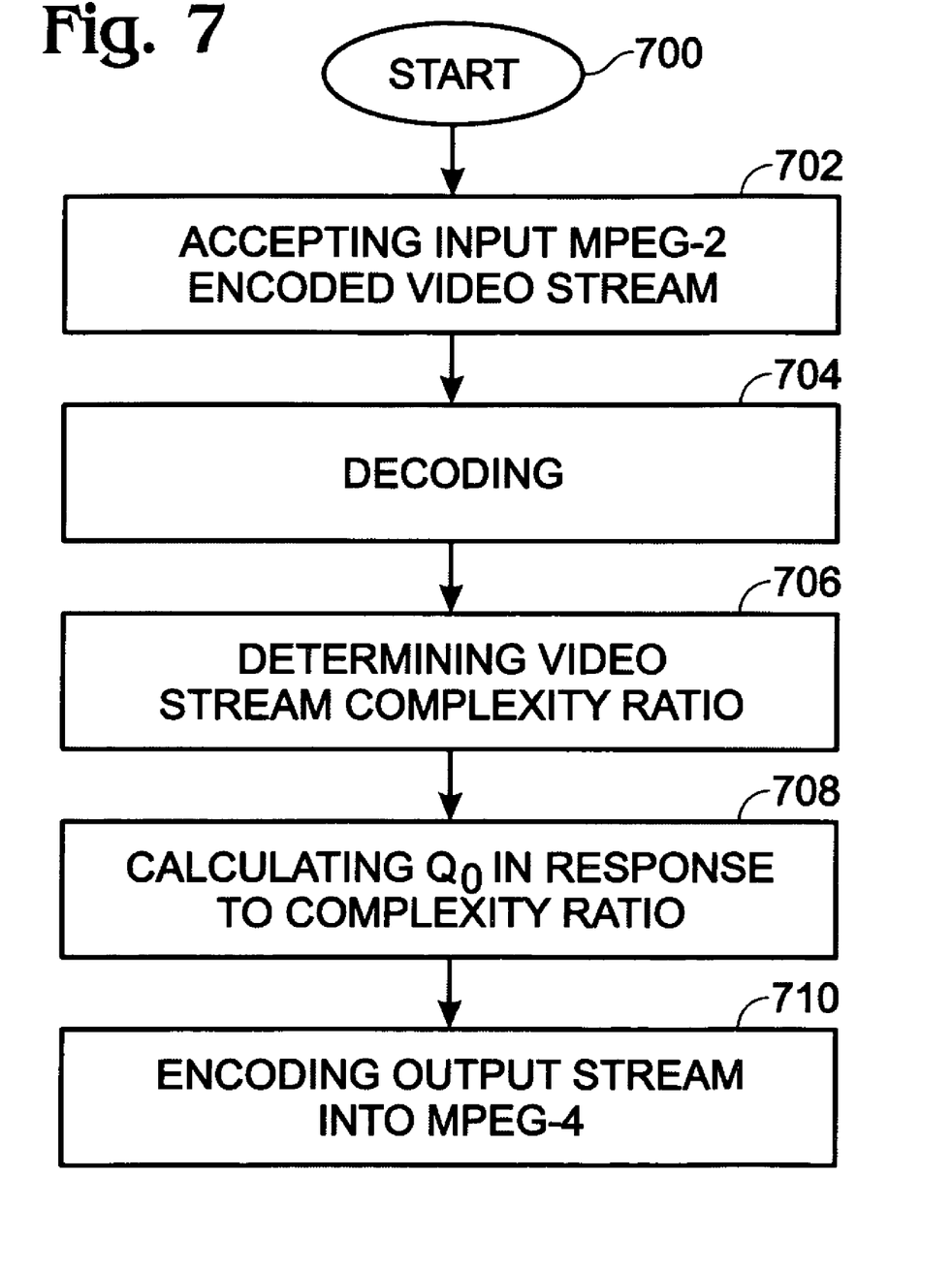
FIG. 7 is a flowchart depicting an alternate aspect of the present invention method for adaptive rate control in the transcoding of MPEG video streams.

FIG. 7 is a flowchart depicting an alternate aspect of the present invention method for adaptive rate control in the transcoding of MPEG video streams. The method starts at Step 700. Step 702 accepts frames of an input MPEP-2 encoded video stream. Step 704 decodes the video stream. Step 706 determines a video stream complexity ratio: of an accumulated complexity in the output video stream, to an accumulated complexity in the input video stream. Step 708, for each frame, calculates an output video stream quantization parameter (Qo) in response to the complexity ratio. Step 710 encodes the output video stream into an MPEG-4 protocol using Qo.

A system and method have been provided for adaptive rate control in the transcoding of compressed video streams. An example of transcoding from the MPEG-2, to the MPEG-4 format has been given, but the invention is not limited to merely this example. Specifically descriptions of exemplary complexity determinations have also been provided. However, it should be understood that the invention is not limited to one particular formula. Other variations and embodiments of the invention will occur to those skilled in the art.

We claim:

1. In the transcoding of video streams, a method for adaptive rate control, the method comprising:
   accepting frames of an input MPEG encoded video stream;
   decoding the video stream;
   calculating an average input video stream quantization factor (Qi) for each frame
   accepting a target bit rate ratio (r) for transcoding the video stream that is equal to the ratio of the target output video stream number of bits per frame (No), to the input video stream number of bits per frame (Ni) as follows:
   r=No/Ni;
   for each frame, calculating an output video stream quantization parameter (Qo) as follows:
   Qo=Qi/r; and,
   encoding the output video stream into a protocol using Qo.

2. The method of claim 1 wherein accepting frames of an input MPEG encoded video stream includes accepting frames with a plurality of slices; and,
wherein calculating Qi for each frame includes calculating the quantization parameter by averaging the Qi values for each slice in a frame.

3. The method of claim 1 wherein accepting an input MPEG encoded video stream includes accepting intra (I), predictive (P), and bi-directionally predictive (B) picture types; and,
wherein determining the video stream complexity of the input MPEG encoded video stream includes:
independently determining the complexities of the I, P, and B picture types in the input video stream; and,
independently determining the complexities of the I, P, and B picture types in the output video stream.

4. The method of claim 1 wherein determining the video stream complexity includes determining a complexity ratio: of an accumulated complexity in the output video stream, to an accumulated complexity in the input video stream.

5. The method of claim 4 wherein the accumulated complexity in the input video stream is the product of Qi times Ni, accumulated over a plurality of frames; and,
wherein the accumulated complexity of the output video stream is the product of Qo times No, accumulated over the plurality of frames.

6. The method of claim 5 wherein determining the video stream complexity includes expressing the complexity ratio ($\alpha_k$) as follows:

$$\alpha_k = \frac{\sum_{j=0}^{k-1}(Q_{o,j} \cdot N_{o,j})}{\sum_{j=0}^{k-1}(Q_{i,j} \cdot N_{i,j})};$$

wherein j equals the plurality of frames; and,
wherein k is the current frame.

7. The method of claim 6 wherein calculating Qo includes calculating Qo, for each frame, as follows:

$Qo=(\alpha_k \cdot Qi)/r.$

8. The method of claim 7 further comprising:
determining an actual bit rate ratio (r') for transcoding the video stream as follows:

$r'=No/Ni;$ where No and Ni are accumulated over a plurality of frames;
determining a feedback correction factor ($B_k$) responsive to the value of r'; and,
wherein calculating Qo includes modifying the value of Qo in response to $B_k$.

9. The method of claim 8 wherein determining $B_k$ includes determining $B_k$, for each frame, as follows:

$B_k=r'/r.$

10. The method of claim 9 wherein calculating Qo includes calculating Qo, for each frame, as follows:

$Qo=(\alpha_k \cdot Qi)/r \cdot B_k;$ wherein the value of $\alpha_k$ is updated after every frame.

11. The method of claim 1
wherein encoding the output video stream into a protocol using Qo includes encoding the output video stream into an MPEG-4 video stream using r.

12. In the transcoding of video streams, a system for adaptive rate control, the system comprising:
a decoder having an interface to accept frames of an input MPEG encoded video stream, an interface to supply a decoded video stream, and an interface to supply decoding process information including an average input video stream quantization factor (Qi) for each frame;
a transcoder control unit having an interface to accept the decoding process information and an interface to accept a target bit rate ratio (r) for transcoding the video stream that is equal to the ratio of the target output video stream number of bits per frame (No), to the input video stream number of bits per frame (Ni) as follows:

$r=No/Ni;$ the transcoder control unit determining video stream complexity and supplying an output video stream quantization parameter (Qo) initially calculated as follows:

$Qo=Qi/r;$ and,
an encoder having an interface to accept the decoded video, an interface to accept Qo, and an interface to supply an output video stream encoded into a protocol using Qo.

13. The system of claim 12 wherein the decoder accepts frames of an input MPEG encoded video stream with a plurality of slices; and,
wherein the decoder calculates Qi for each frame by averaging the Qi values for each slice in a frame.

14. The system of claim 12 wherein the decoder accepts an input MPEG encoded video stream including intra (I), predictive (P), and bi-directionally predictive (B) picture types; and,
wherein the transcoder control unit independently determines the complexities of the I, P, and B picture types in the input video stream, and independently determines the complexities of the I, P, and B picture types in the output video stream.

15. The system of claim 12 wherein the transcoder control unit calculates Qo in response to a complexity ratio of: an accumulated complexity in the output video stream, to an accumulated complexity in the input video stream.

16. The system of claim 15 wherein the transcoder control unit calculates an accumulated complexity in the input video stream as the product of Qi times Ni, accumulated over a plurality of frames, and calculates the accumulated complexity of the output video stream as the product of Qo times No, accumulated over the plurality of frames.

17. The system of claim 16 wherein the transcoder control unit calculates the complexity ratio ($\alpha_k$) as follows:

$$\alpha_k = \frac{\sum_{j=0}^{k-1}(Q_{o,j} \cdot N_{o,j})}{\sum_{j=0}^{k-1}(Q_{i,j} \cdot N_{i,j})};$$

wherein j equals the plurality of frames; and,
wherein k is the current frame.

18. The system of claim 17 wherein the transcoder control unit calculates Qo, for each frame, as follows:

$$Qo=(\alpha_k \cdot Qi)/r.$$

19. The system of claim 18 wherein the transcoder control unit determines an actual bit rate ratio (r') for transcoding the video stream as follows:

$$r'=No/Ni;$$

where No and Ni are accumulated over a plurality of frames; and, wherein the transcoder control unit determines a feedback correction factor ($B_k$) responsive to the value of r', and modifies the value of Qo in response to $B_k$.

20. The system of claim 19 wherein the transcoder control unit determines $B_k$, for each frame, as follows:

$$B_k=r'/r.$$

21. The system of claim 20 wherein the transcoder control unit calculates Qo, for each frame, as follows:

$$Qo=(\alpha_k \cdot Qi)/r \cdot B_k;$$

wherein the value of oak is updated after every frame.

22. The system of claim 12
wherein the encoder encodes the output video stream into an MPEG-4 protocol.

* * * * *